US012235242B2

(12) United States Patent
Mochi et al.

(10) Patent No.: US 12,235,242 B2
(45) Date of Patent: Feb. 25, 2025

(54) SENSOR ARRANGEMENT AND METHOD FOR MEASURING FOULING AND/OR EROSION, AND MACHINE MONITORING FOULING AND/OR EROSION

(71) Applicant: NUOVO PIGNONE TECNOLOGIE—S.r.l., Florence (IT)

(72) Inventors: Gianni Mochi, Florence (IT); Paolo Trallori, Florence (IT); Massimiliano Tempestini, Florence (IT); Giuseppe Stringano, Florence (IT); Alessandro Betti, Florence (IT)

(73) Assignee: Nuovo Pignone Tecnologie—S.r.l., Florence (IT)

( * ) Notice: Subject to any disclaimer, the term of this patent is extended or adjusted under 35 U.S.C. 154(b) by 537 days.

(21) Appl. No.: 17/594,515

(22) PCT Filed: Apr. 20, 2020

(86) PCT No.: PCT/EP2020/025179
§ 371 (c)(1),
(2) Date: Oct. 20, 2021

(87) PCT Pub. No.: WO2020/216469
PCT Pub. Date: Oct. 29, 2020

(65) Prior Publication Data
US 2022/0196606 A1 Jun. 23, 2022

(30) Foreign Application Priority Data
Apr. 23, 2019 (IT) .................. 102019000006274

(51) Int. Cl.
*G01N 29/12* (2006.01)
*F04D 17/12* (2006.01)
(Continued)

(52) U.S. Cl.
CPC ............. *G01N 29/12* (2013.01); *F04D 17/12* (2013.01); *F04D 27/001* (2013.01);
(Continued)

(58) Field of Classification Search
CPC .............. G01N 29/12; G01N 29/2437; G01N 29/4436; G01N 2291/014;
(Continued)

(56) References Cited

U.S. PATENT DOCUMENTS

| 4,561,286 A | 12/1985 | Sekler et al. |
| 4,808,538 A | 2/1989 | Roffey et al. |

(Continued)

FOREIGN PATENT DOCUMENTS

| CH | 683375 A5 | 2/1994 |
| EP | 0150552 A1 | 8/1985 |

(Continued)

*Primary Examiner* — Jennifer Bahls
*Assistant Examiner* — Quang X Nguyen
(74) *Attorney, Agent, or Firm* — Paul Frank + Collins P.C.

(57) ABSTRACT

A sensor arrangement used for measuring fouling and/or erosion in a machine. A first piezoelectric transducer, a first plate and eventually a first support member form a first vibrating mass. After electrically stimulating the first piezoelectric transducer, the first vibrating mass starts vibrating mechanically and consequently the first piezoelectric transducer generates an electric resonance vibration; the electric resonance vibration is at a resonance frequency depending on the mass of the first vibrating mass. If the mass of the first vibrating mass changes due to fouling and/or erosion by a flow of working fluid in the machine, also the electric resonance vibration frequency changes; such vibration frequency change may be measured and the corresponding mass change may be determined by comparison with a (Continued)

vibration frequency of a second vibrating mass not exposed to the flow of working fluid in the machine.

20 Claims, 5 Drawing Sheets (51) Int. Cl.
   *F04D 27/00* (2006.01)
   *G01N 17/00* (2006.01)
   *G01N 29/24* (2006.01)
   *G01N 29/44* (2006.01)
(52) U.S. Cl.
   CPC ....... *G01N 17/008* (2013.01); *G01N 29/2437* (2013.01); *G01N 29/4436* (2013.01); *G01N 2291/014* (2013.01); *G01N 2291/0258* (2013.01); *G01N 2291/2693* (2013.01)
(58) Field of Classification Search
   CPC ... G01N 2291/0258; G01N 2291/2693; G01N 17/04; G01N 17/008; G01N 17/006; F04D 17/12; F04D 27/001
   See application file for complete search history.

(56) References Cited

U.S. PATENT DOCUMENTS

| | | | |
|---|---|---|---|
| 5,386,714 A | * | 2/1995 | Dames ................ G01N 29/036 73/32 A |
| 6,880,402 B1 | | 4/2005 | Couet et al. |
| 2006/0037399 A1 | | 2/2006 | Brown |
| 2008/0282781 A1 | | 11/2008 | Hemblade |
| 2012/0264220 A1 | | 10/2012 | Rahmathullah et al. |
| 2019/0094167 A1 | | 3/2019 | Mochi et al. |

FOREIGN PATENT DOCUMENTS

| | | |
|---|---|---|
| EP | 0785427 A1 | 7/1997 |
| EP | 1217359 A1 | 6/2002 |
| GB | 2109937 A | 6/1983 |

\* cited by examiner

SENSOR ARRANGEMENT AND METHOD FOR MEASURING FOULING AND/OR EROSION, AND MACHINE MONITORING FOULING AND/OR EROSION

TECHNICAL FIELD

The subject-matter disclosed herein relates to sensor arrangements and methods for measuring fouling and/or erosion and machines wherein fouling and/or erosion is monitored.

BACKGROUND ART

In general, machines are subject to fouling and/or erosion during their operation.

This is especially true for turbomachines, in particular single-stage or multi-stage centrifugal compressors, wherein fouling and/or erosion during operation are at least partially due to a flowing of working fluid in an internal flow path of the machine. Both fouling and erosion are due to material carried by the flowing working fluid; if flowing velocity is low erosion is also low; if flowing velocity reduces dirt tends to deposit more.

When fouling (at one or more internal places of the machine) reaches an excessive level, the machine should be stopped, cleaned and restarted; in fact, fouling inside the machine may cause for example loss of efficiency of the machine. Cleaning often requires disassembling the machine which is complicated and time-consuming and thus expensive. Therefore, at least ideally, such maintenance operation should be performed always when necessary but preferably only when necessary.

When erosion (of one or more components of the machine) reaches an excessive level, the machine should be stopped, repaired and restarted; in fact, if the eroded component should break, huge damages to the machine may occur; in any case, erosion inside the machine may cause for example loss of efficiency of the machine. Repairing always requires disassembling the machine which is complicated and time-consuming and thus expensive. Therefore, at least ideally, such maintenance operation should be performed always when necessary but preferably only when necessary.

SUMMARY

Therefore, it would be desirable to monitor fouling and/or erosion at one or more internal places of the machine so to take the appropriate steps when they reach a predetermined level that is considered excessive.

According to one aspect, the subject-matter disclosed herein relates to a sensor arrangement for measuring fouling and/or erosion in a machine; the sensor arrangement includes: a first piezoelectric transducer and a first plate, the first plate being fixedly coupled to the first piezoelectric transducer so to form a first single vibrating mass; the first piezoelectric transducer is arranged to be stimulated by electric signals applied to the sensor arrangement; a second piezoelectric transducer and a second plate, the second plate being fixedly coupled to the second piezoelectric transducer so to form a second single vibrating mass; the second piezoelectric transducer is arranged to be stimulated by electric signals applied to the sensor arrangement; the sensor arrangement is arranged to be installed in the machine so that the first plate is exposed to a flow of a working fluid in the machine (i.e. in the flow path of the machine) while the second plate is exposed to the working fluid but not to its flow (i.e. the fluid is still and the flow velocity is zero).

According to another aspect, the subject-matter disclosed herein relates to a machine arranged to operate through a working fluid flowing in an internal flow path of the machine; the machine includes at least one sensor arrangement. The sensor arrangement includes: a first piezoelectric transducer and a first plate, the first plate being fixedly coupled to the first piezoelectric transducer so to form a first single vibrating mass; the first piezoelectric transducer is arranged to be stimulated by electric signals applied to the sensor arrangement; a second piezoelectric transducer and a second plate, the second plate being fixedly coupled to the second piezoelectric transducer so to form a second single vibrating mass; the second piezoelectric transducer is arranged to be stimulated by electric signals applied to the sensor arrangement; the sensor arrangement is arranged to be installed in the machine so that the first plate is exposed to a flow of a working fluid in the machine (i.e. in the flow path of the machine) while the second plate is exposed to the working fluid but not to its flow (i.e. the fluid is still and the flow velocity is zero). The first plate forms a portion of a wall of the flow path.

According to still another aspect, the subject-matter disclosed herein relates to a method for measuring fouling and/or erosion on a wall of an internal flow path of the machine; the method includes the steps of: A) repeatedly stimulating a first piezoelectric transducer by a first stimulation electric signal so that the first piezoelectric transducer generates a first electric resonance vibration, the first piezoelectric transducer being part of a first vibrating mass integrated into said wall; B) repeatedly measuring a resonance frequency of the first electric resonance vibration; C) repeatedly stimulating a second piezoelectric transducer by a second stimulation electric signal so that the second piezoelectric transducer generates a second electric resonance vibration, the second piezoelectric transducer being part of a second vibrating mass positioned close to said first vibrating mass but remote from said wall; D) repeatedly measuring a resonance frequency of said second electric resonance vibration; and E) repeatedly comparing said resonance frequency of said first electric resonance vibration and said resonance frequency of said second electric resonance vibration.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

and

DETAILED DESCRIPTION OF EMBODIMENTS

The Applicant has considered that fouling and erosion in a machine imply a mass change inside the machine: in the case of fouling, a mass of material is deposited (i.e. added) in a certain place of the machine (in particular a certain place of a component of the machine); in the case of erosion, a mass of material is removed (i.e. subtracted) from a certain place of the machine (in particular a certain place of a component of the machine).

Therefore, the Applicant has thought of monitoring fouling and/or erosion by repeating a mass measurement in the one or more places of a machine where one or more of these phenomena are likely to occur. If a mass change is detected, this means that some fouling or erosion has occurred.

There are various approaches of measuring mass, but it is very difficult to do it inside an operating machine especially in internal places where a working fluid of the machine is flowing.

The Applicant has identified an approach that is particularly effective in such circumstances, i.e. the inertial balance measurement carried out through a sensor arrangement that will be briefly described in the following.

A piezoelectric transducer and a plate are fixed together so to form a vibrating mass. After electrically stimulating the piezoelectric transducer, the vibrating mass starts vibrating mechanically, which is called "natural resonance", and consequently the piezoelectric transducer generates an electric resonance vibration; the electric resonance vibration is at a frequency depending on the overall mass of the vibrating mass, which is called "natural resonance frequency". If the overall mass of the vibrating mass changes due to e.g. fouling or erosion in the machine, also the electric vibration frequency changes, i.e. the "natural resonance frequency" changes; such frequency change may be measured and the corresponding mass change may be determined.

A sensor arrangement operating according to the above described principle may be installed inside a machine (either in a stator component of the machine or in a rotor component of the machine). In case fouling is of interest, the sensor arrangement is positioned so that dirt (due to the working fluid flow) deposits on the plate and changes the overall mass of the vibrating mass. In case erosion is of interest, the sensor arrangement is positioned so that erosion (due to the working fluid flow) acts on the plate and changes the overall mass of the vibrating mass.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

When introducing elements of various embodiments the articles "a", "an", "the", and "said" are intended to mean that there are one or more of the elements. The terms "comprising", "including", and "having" are intended to be inclusive and mean that there may be additional elements other than the listed elements.

Figure 1:
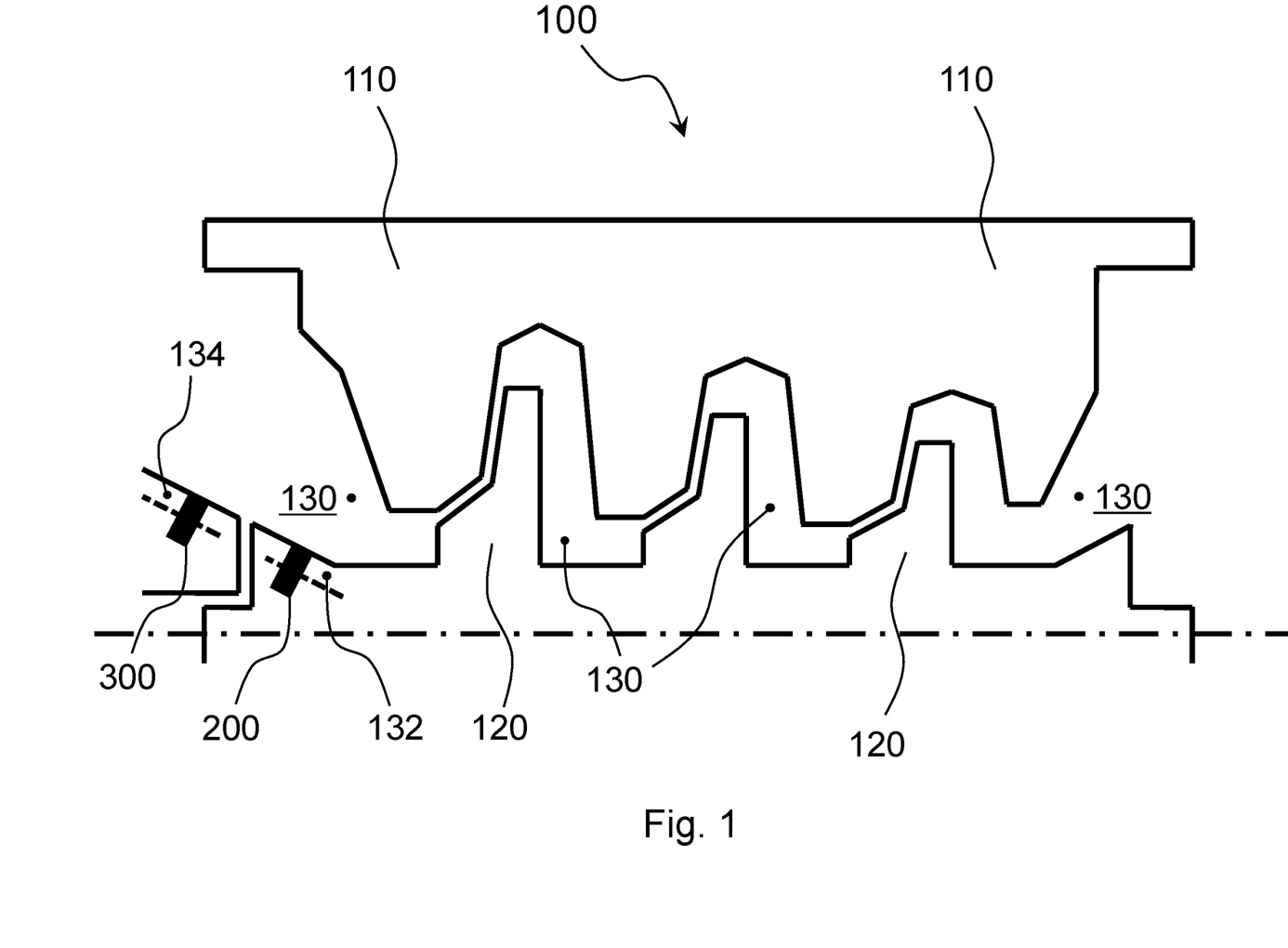
FIG. 1 illustrates a schematic longitudinal cross-section view of an embodiment of a machine, in particular a multi-stage centrifugal compressor.

Referring now to the drawings, FIG. 1 illustrates a schematic longitudinal cross-section view of an embodiment of a machine 100, in particular a multi-stage centrifugal compressor. Machine 100 comprises a rotor 120 and a stator 110; in particular, stator 110 surrounds rotor 120. An internal flow path 130 is defined between stator 110 and rotor 120, and develops from an inlet of machine 100 (on the left in FIG. 1) to an outlet of machine 100 (on the right of FIG. 1). During operation of machine 100, flow path 130 is arranged to receive a working fluid at the inlet of machine 100, feed it and discharge it from the outlet of machine 130. In the embodiment of FIG. 1, by flowing along flow path 130, in particular inside flow channels of e.g. three impellers of rotor 120, the working fluid causes rotation of rotor 120.

Due to the flow of the working fluid in flow path 130, fouling and/or erosion may occur on one or more parts of stator 110 and/or of rotor 120.

In the embodiment of FIG. 1, fouling and/or erosion are monitored for example through a first sensor arrangement 200 and a second sensor arrangement 300. In general, the number of such sensor arrangements may vary from one to e.g. one hundred.

These sensor arrangements are positioned adjacent to flow path 130 (as will be explained better in the following), specifically a part of a sensor arrangement forms a portion of a wall of the flow path; any of these sensor arrangements may be mounted to stator 110 or rotor 120. Sensor arrangement 200 is mounted to rotor 120 and a part thereof forms a portion of wall 132. Sensor arrangement 300 is mounted to stator 110 and a part thereof forms a portion of wall 134. While in the embodiment of FIG. 1, sensor arrangements are located in an inlet region of machine 100, it is to be understood that in alternative embodiments sensor arrangements may be located in the inlet region and/or in the outlet region and/or in an intermediate region of the machine.

If a sensor arrangement, like e.g. sensor arrangement 300, is mounted to a stator of a machine, a wired connection is used for connecting it for example to a measurement or monitor electronic unit of the machine.

If a sensor arrangement, like e.g. sensor arrangement 200, is mounted to a rotor of a machine, a wireless connection is used for connecting it for example to a measurement or monitor electronic unit of the machine. As a person skilled in the art understands a wireless connection is more complicated than a wired connection.

Figure 2:
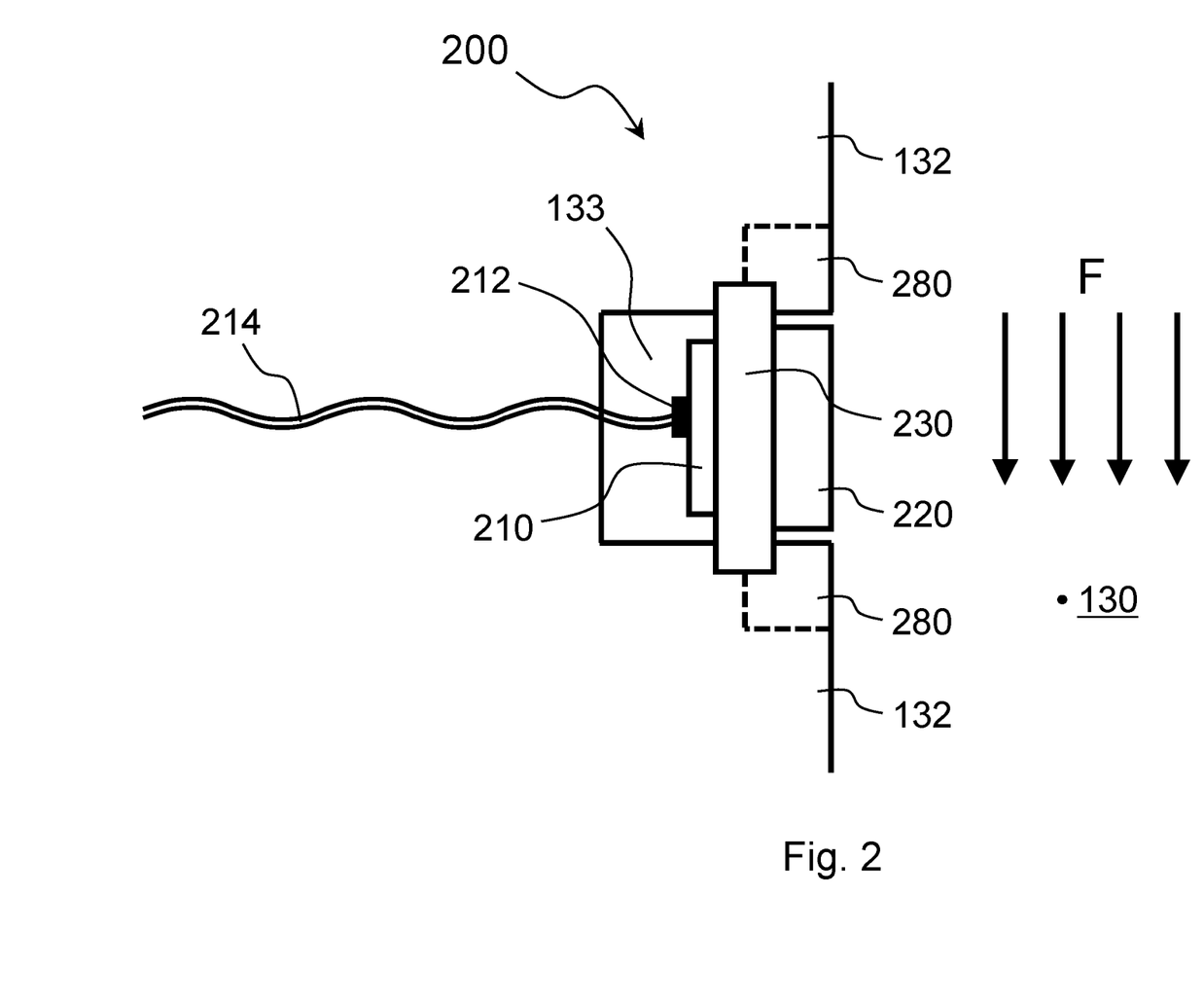
FIG. 2 illustrates a schematic transversal cross-section view of a simplified version of an embodiment of a sensor arrangement for measuring fouling or erosion.

Referring now to FIG. 2, sensor arrangement 200 is arranged to measure fouling or erosion and comprises at least a first piezoelectric transducer 210 and a first plate 220; first piezoelectric transducer 210 and first plate 220 are fixedly coupled together so to form a first single vibrating mass. It is to be noted that sensor arrangement 200 of FIG. 2 is to be considered a simplified version of sensor arrangement 300 of FIG. 3; the following explanation is useful for understanding the embodiment of FIG. 3.

Figure 3:
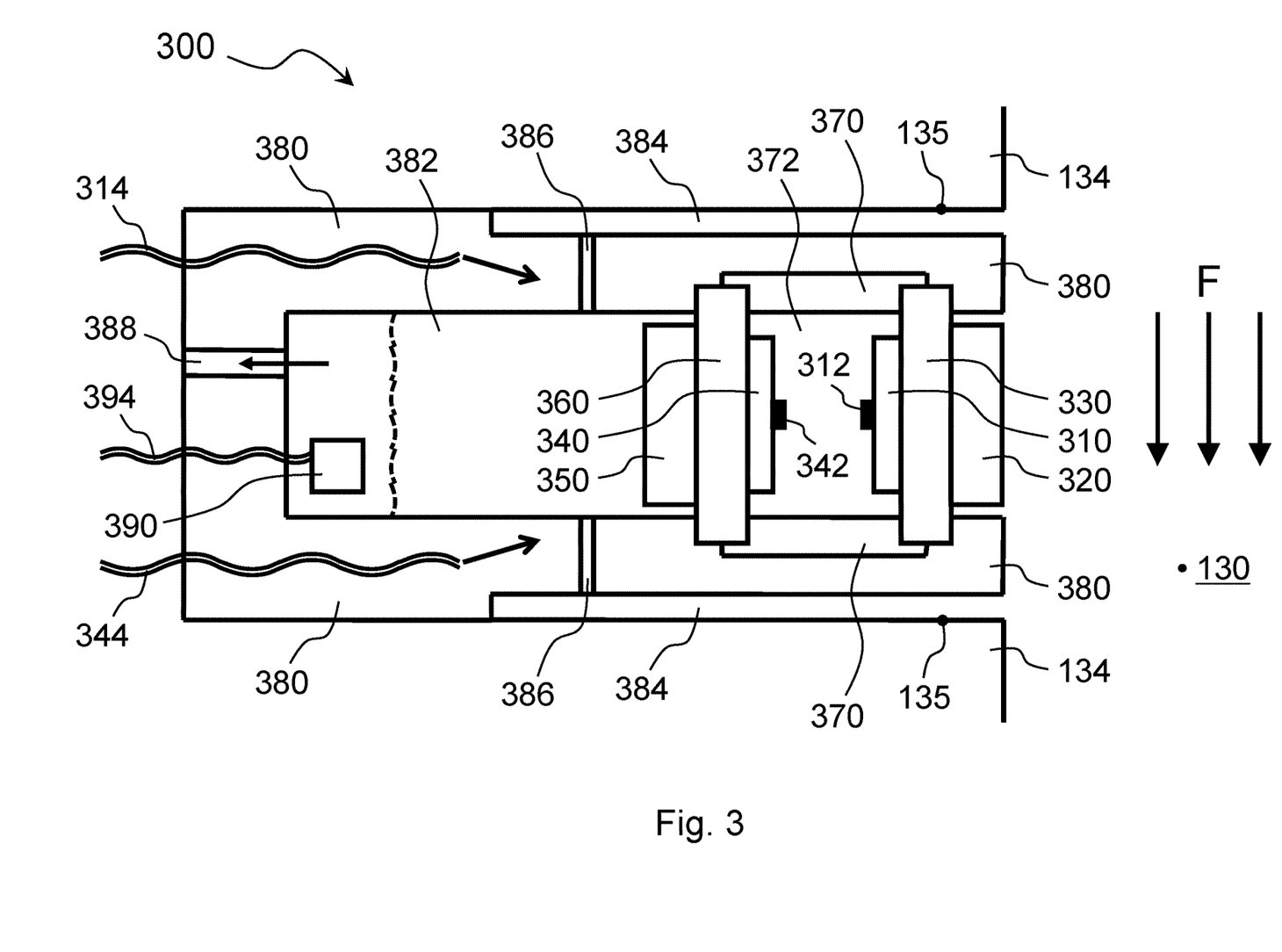
FIG. 3 illustrates a schematic cross-section view of an embodiment of a sensor arrangement for measuring fouling or erosion in a machine.

In the solution of FIG. 2, that is a simplified version of the embodiment of FIG. 3, the sensor arrangement comprises further a first support member 230; first piezoelectric transducer 210 and first plate 220 are fixedly coupled to first support member 230 so that the first single vibrating mass is formed by the combination of first piezoelectric transducer 210, first plate 220 and first support member 230. Advantageously, first piezoelectric transducer 210 is fixed to a first side of first support member 230 designed to be remote from a flow path (130 in FIG. 2) of a machine and first plate 220 is fixed to a second side of first support member 230 designed to be close to a flow path (130 in FIG. 2) of a machine.

First piezoelectric transducer 210 is arranged to be stimulated by electric signals applied to sensor arrangement 200; for example, FIG. 2 shows an electric cable 214 electrically connected to contacts 212 of first piezoelectric transducer 210, and arranged to feed electric signals to/from first piezoelectric transducer 210. Electric cable 214 is arranged to feed stimulation electric signals from e.g. a measurement or monitor electronic unit to first piezoelectric transducer 210. Electric cable 214 is also arranged to feed resonance vibration electric signals from first piezoelectric transducer 210 to e.g. a measurement or monitor electronic unit; a resonance vibration electric signal is a consequence of an electric stimulation, typically of a previous electric stimulation.

As can been in FIG. 2, sensor arrangement 200 is arranged to be installed in a machine so that first plate 220 is exposed to a flow F of working fluid in the machine (i.e. in the flow path of the machine). Preferably, first plate forms a portion of wall 132 of flow path 130; preferably, just after installation of sensor arrangement 200 (i.e. before any fouling and/or erosion), surface of first plate 220 is aligned with surrounding surface of wall 132.

Sensor arrangement 200 is positioned inside a recess 133 of a wall 132 and is fixed to wall 132. According to the solution of FIG. 2, an annular member 280 is used for fixing sensor arrangement 200 to wall 132; for example, a periphery of first support member 230 is held by annular member 280 and annular member 280 is screwed or fit in a hole of wall 132.

Sensor arrangement 200 as shown in detail in FIG. 2 is used for measuring fouling or erosion on a wall of an internal flow path of machine 100. The solution shown in FIG. 2 may be used also for measuring corrosion; however, in this case, is not truly a simplified version of the embodiment of FIG. 3. Although in FIG. 1, sensor arrangement 200 is mounted to a rotor wall, a similar sensor arrangement may alternatively be mounted to a stator wall.

A simplified version of an embodiment of a method for measuring fouling or erosion based on sensor arrangement 200 or a similar sensor arrangement, i.e. a simplified version of the embodiment of FIG. 5, will be explained in the following with reference to a flow chart 400 of FIG. 4.

Flow chart 400 comprises a START step 410 and an END step 490.

The method according to flow chart 400 includes a preliminary step 420 of positioning a first single vibrating mass formed by an assembly of at least a first piezoelectric transducer (for example first piezoelectric transducer 210 in FIG. 2) and a first plate (for example first plate 220 in FIG. 2), the first plate forming a portion of a flow path wall.

Furthermore, the method according to flow chart 400 further includes the steps of:
A) step 430: repeatedly stimulating the first piezoelectric transducer (for example first piezoelectric transducer 210 in FIG. 2) by a first stimulation electric signal so that the first piezoelectric transducer (for example first piezoelectric transducer 210 in FIG. 2) generates a first electric resonance vibration, and B) step 440: repeatedly measuring a resonance frequency of said first electric resonance vibration (that may be called "first resonance frequency").

Figure 4:
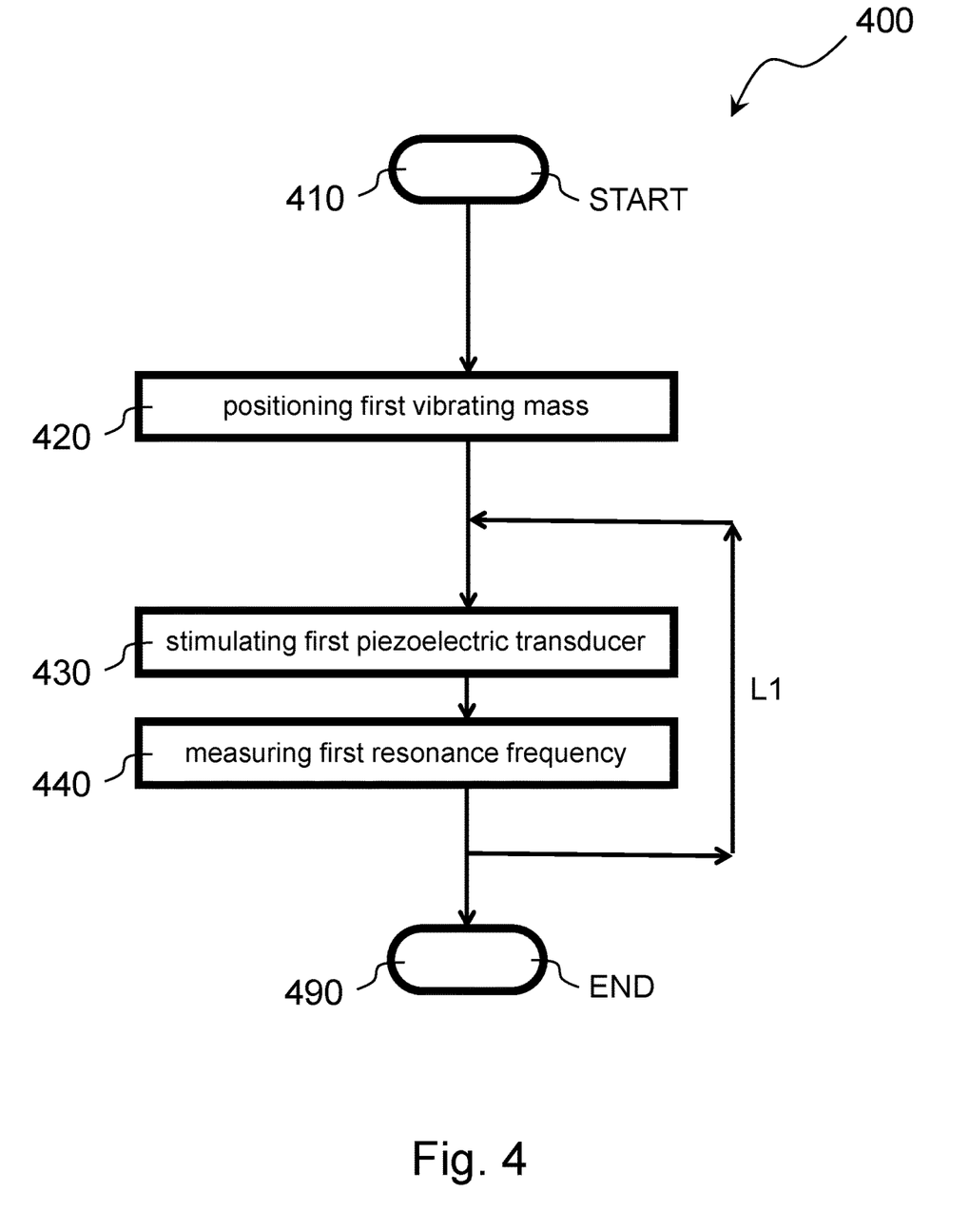
FIG. 4 shows a flow chart of a simplified version of an embodiment of a method of measuring fouling or erosion in a machine.

The repetition referred to in steps 430 and 440 corresponds to loop L1 in flow chart 400 of FIG. 4. The loop may be repeated with a period preferably longer than 1 hour and preferably shorter than 1 day as fouling and erosion progress quite slowly; it is to be noted that the period of repetition does not need to be strictly constant, for example a variation of up to 10% or 20% (or even more) is acceptable.

It is to be noted that step 420 is carried out when assembling machine 100, while steps 430 and 440 are carried out during operation of machine 100, i.e. they are part of a measuring process. Loop L1 may be continuously repeated from start-up of machine 100 to shut-down of machine 100; therefore, advantageously, loop L1 is interrupted when machine 100 is not operating.

Preferably, the resonance frequency of the first electric resonance vibration is greater than 20 KHz.

Steps 430 and 440 may be carried out for example by a measurement or monitor electronic unit of machine 100 that is not shown in any figure and that may be electrically connected to electric cable 214 of sensor arrangement 200.

The above-mentioned measurement or monitor electronic unit may process the frequency measurements carried out. For example, any time it makes a frequency measurement, it may compare the measured value with an upper threshold value and/or a lower threshold value; if any of these threshold values is exceeded it may signal such event for example to an electronic control unit of the machine and/or to an operator; such signaling may be an electronic indication (for example and electronic message sent to an electronic control unit of the machine) and/or a visual indication and/or a sound indication. It is to be noted that a frequency measurement may be subject to some pre-processing before threshold comparison or comparisons for example in order to take into account the current temperature of the components of the sensor arrangement.

Referring now to FIG. 3, sensor arrangement 300 is arranged to measure fouling or erosion and comprises at least a first piezoelectric transducer 310 and a first plate 320; first piezoelectric transducer 310 and first plate 320 are fixedly coupled together so to form a first single vibrating mass.

In the embodiment of FIG. 3, the sensor arrangement comprises further a first support member 330; first piezoelectric transducer 310 and first plate 320 are fixedly coupled to first support member 330 so that the first single vibrating mass is formed by the combination of first piezoelectric transducer 310, first plate 320 and first support member 330. Advantageously, first piezoelectric transducer 310 is fixed to a first side of first support member 330 designed to be remote from a flow path (130 in FIG. 3) of a machine and first plate 320 is fixed to a second side of first support member 330 designed to be close to a flow path (130 in FIG. 3) of a machine.

First piezoelectric transducer 310 is arranged to be stimulated by electric signals applied to sensor arrangement 300; for example, FIG. 3 shows an electric cable 314 electrically connected to contacts 312 of first piezoelectric transducer 310, and arranged to feed electric signals to/from first piezoelectric transducer 310. Electric cable 314 is arranged to feed stimulation electric signals from e.g. a measurement or monitor electronic unit to first piezoelectric transducer 310. Electric cable 314 is also arranged to feed resonance vibration electric signals from first piezoelectric transducer 310 to e.g. a measurement or monitor electronic unit; a resonance vibration electric signal is a consequence of an electric stimulation, typically of a previous electric stimulation.

As can been in FIG. 3, sensor arrangement 300 is arranged to be installed in a machine so that first plate 320 is exposed to a working fluid flow F in the machine (i.e. in the flow path of the machine). Preferably, first plate forms a portion of wall 133 of flow path 130; preferably, just after installation of sensor arrangement 300 (i.e. before any fouling and erosion), surface of first plate 320 is aligned with surrounding surface of wall 134.

Sensor arrangement 300 comprises further at least a second piezoelectric transducer 340 and a second plate 350; second piezoelectric transducer 340 and second plate 350 are fixedly coupled together so to form a second single vibrating mass.

In the embodiment of FIG. 3, the sensor arrangement comprises further a second support member 360; second piezoelectric transducer 340 and second plate 350 are fixedly coupled to second support member 360 so that the second single vibrating mass is formed by the combination of second piezoelectric transducer 340, second plate 350 and second support member 360. Advantageously, second piezoelectric transducer 340 is fixed to a first side of second support member 360 designed to be close to a flow path (130 in FIG. 3) of a machine and second plate 350 is fixed to a second side of second support member 360 designed to be remote from a flow path (130 in FIG. 3) of a machine.

Second piezoelectric transducer 340 is arranged to be stimulated by electric signals applied to sensor arrangement 300; for example, FIG. 3 shows an electric cable 344 electrically connected to contacts 342 of second piezoelectric transducer 340, and arranged to feed electric signals to/from second piezoelectric transducer 340. Electric cable 344 is arranged to feed stimulation electric signals from e.g. a measurement or monitor electronic unit to first piezoelectric transducer 340. Electric cable 344 is also arranged to feed resonance vibration electric signals from second piezoelectric transducer 340 to e.g. a measurement or monitor electronic unit; a resonance vibration electric signal is a consequence of an electric stimulation, typically of a previous electric stimulation.

As can been in FIG. 3, sensor arrangement 300 is arranged to be installed in a machine so that second plate 350 is exposed to a working fluid of the machine (i.e. still or at zero flow velocity) but not exposed to a flow F of the working fluid in the machine (i.e. in the flow path of the machine) (that means that should not be subject to fouling or erosion), and so that at least first piezoelectric transducer 310, first plate 320, second piezoelectric transducer 340, and second plate 350 are exposed approximately to a same temperature and to a same pressure. In the embodiment of FIG. 3, even first support member 330 and second support member 360 are exposed approximately to a same temperature and to a same pressure.

According to the embodiment of FIG. 3, sensor arrangement 300 may comprise further a first cavity 372. The first single vibrating mass, i.e. the combination of elements 310+320+330, is positioned on a first side of first cavity 372, while the second single vibrating mass, i.e. the combination of elements 340+350+360, is positioned on a second side of first cavity 372; the second side is different from the first side.

Preferably and as shown in FIG. 3, the second side is opposite to the first side. Advantageously, a hollow separation member 370 is fit between the first single vibrating mass and the second single vibrating mass; a transversal cross-section (not shown in FIG. 3) of member 370 may have the shape of a circle or a polygon.

Advantageously, a separation wall component (not shown in FIG. 3) may be located inside first cavity 372; such separation wall component is aimed at avoiding or at least limiting frequency interactions between the first vibrating mass and the second vibrating mass which are unwanted. Such separation wall component may take the form for example of disk made of stainless steel and fixed at its boundary to the hollow separation member 370; in this way, first cavity 372 is divided into two sub-cavities.

According to the embodiment of FIG. 3, sensor arrangement 300 may comprise further a second cavity 382. The second single vibrating mass, i.e. the combination of elements 340+350+360, is positioned also on a side of second cavity 382.

Advantageously, first cavity 372 is arranged to be in fluid communication with a working fluid flow path (130 in FIG. 3) of the machine; in this way, especially second piezoelectric transducer 340 is exposed approximately to a same temperature and to a same pressure as first piezoelectric transducer 310.

Advantageously, second cavity 382 is arranged to receive the working fluid of the machine; in this way, especially second plate 350 is exposed approximately to a same temperature and to a same pressure as first plate 320. In the embodiment of FIG. 3, working fluid passes first through a annular duct 384 (read afterwards) and then through a plurality of hole ducts 386 (read afterwards). It is to noted that the working fluid slowly diffuses into cavity 382 passing through duct 384 and ducts 386; in the way, the working fluid inside cavity 382 is still (or almost still) and therefore does not erode plate 350; in this way, dirt carried by the working fluid gradually deposits on the walls of duct 384 (that are at an appropriate distance) and when the working fluid enters into cavity 382 it is free (or almost free) from dirt so that it does not foul plate 350.

From the mechanical point of view, sensor arrangement 300 may comprise a tubular shell 380 arranged to be fit in a recess 135 of a wall 134 of a flow path 130 of a machine. Tubular shell 380 surrounds both first cavity 372 and second cavity 382. Separation member 370 may be fit into an inner annular recess of tubular shell 380 together with a periphery of first support member 330 and a periphery of second support member 360.

Advantageously, tubular shell 380 has a larger cross-section at its inner zone so to fix inside recess 135 and a small cross-section at its outer zone so to define an annular duct 384 between an inner surface of recess 135 and an outer surface of tubular shell 380. Furthermore in this case, shell 380 has, at its outer zone, a plurality of hole ducts 386 extending from annular duct 384 to second cavity 382.

As, according to this embodiment, a second cavity 382 is arranged to receive the working fluid of the machine, it is preferable to provide a draining channel 388, for example at an inner end of tubular shell 380, arranged to drain liquid from second cavity 382; such liquid may be due to partial condensation of the working fluid.

As, according to this embodiment, a second cavity 382 is arranged to receive the working fluid of the machine, it is preferable to provide a liquid detector 390 positioned in second cavity 382 and arranged to detect for example when liquid in second cavity 382 exceeds a predetermined quantity or level. FIG. 3 shows an electric cable 394 electrically connected to liquid detector 390, and arranged to feed electric signals from liquid detector 390 to e.g. a measurement or monitor electronic unit.

Sensor arrangement 300 as shown in detail in FIG. 3 is used for measuring fouling or erosion on a wall of an internal flow path of machine 100. Although in FIG. 1, sensor arrangement 300 is mounted to a stator wall, a similar sensor arrangement may alternatively be mounted to a rotor wall.

An embodiment of a method for measuring fouling or erosion based on sensor arrangement 300 or a similar sensor arrangement will be explained in the following with reference to a flow chart 500 of FIG. 5.

The method according to this embodiment is significantly similar to the method previously described. In fact, the one previously described is based on a sensor arrangement comprising one vibrating mass and this embodiment is based on a sensor arrangement comprising two vibrating masses, i.e. a first vibrating mass and a second vibrating mass.

Flow chart 500 comprises a START step 510 and an END step 590.

As far as the first vibrating mass is concerned, the method according to flow chart 500 includes a preliminary step 520 of positioning a first single vibrating mass formed by an assembly of at least a first piezoelectric transducer (for example first piezoelectric transducer 310 in FIG. 3) and a first plate (for example first plate 320 in FIG. 3), the first plate forming a portion of a flow path wall.

Still as far as the first vibrating mass is concerned, the method according to flow chart 500 further includes the steps of:

A) step 530: repeatedly stimulating the first piezoelectric transducer (for example first piezoelectric transducer 310 in FIG. 3) by a first stimulation electric signal so that the first piezoelectric transducer (for example first piezoelectric transducer 310 in FIG. 3) generates a first electric resonance vibration, and B) step 540: repeatedly measuring a resonance frequency of said first electric resonance vibration (that may be called "first resonance frequency").

As far as the second vibrating mass is concerned, the method according to flow chart 500 includes a preliminary step 550 of positioning a second single vibrating mass formed by an assembly of at least a second piezoelectric transducer (for example second piezoelectric transducer 340 in FIG. 3) and a second plate (for example first plate 350 in FIG. 3), the second plate being close to the first plate but remote from a flow path wall. In particular, while the first plate is exposed to a flow of a working fluid in the machine (i.e. in the flow path of the machine), the second plate is exposed to the working fluid but not to its flow (i.e. the fluid is still and the flow velocity is zero).

Still as far as the second vibrating mass is concerned, the method according to flow chart 500 further includes the steps of:

C) step 560: repeatedly stimulating the second piezoelectric transducer (for example second piezoelectric transducer 340 in FIG. 3) by a second stimulation electric signal so that the second piezoelectric transducer (for example second piezoelectric transducer 340 in FIG. 3) generates a second electric resonance vibration, and D) step 570: repeatedly measuring a resonance frequency of said second electric resonance vibration (that may be called "second resonance frequency").

Figure 5:
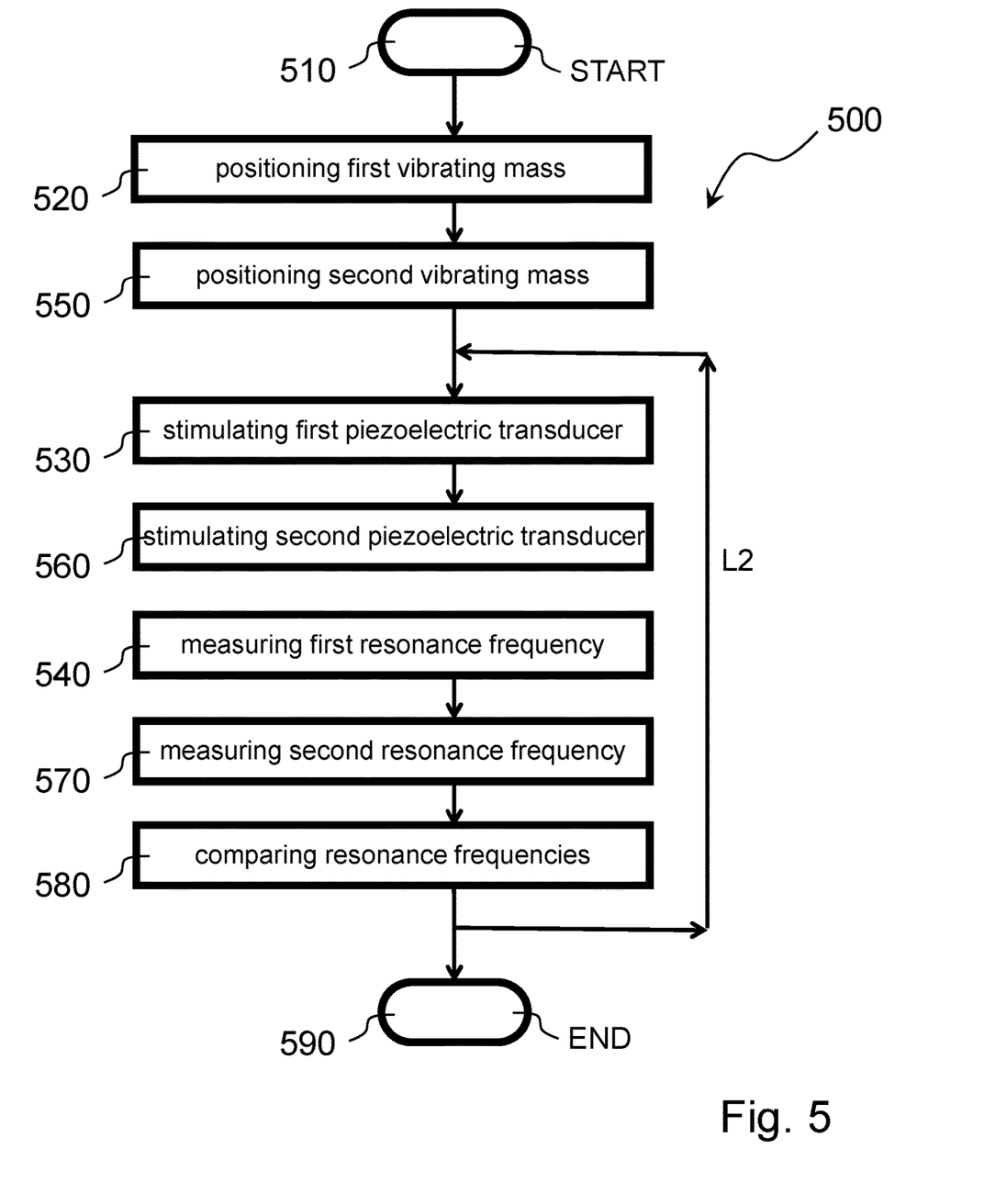
FIG. 5 shows a flow chart of an embodiment of a method of measuring fouling or erosion in a machine.

As shown in FIG. 5, the preferable sequence of the above-mentioned steps is: step 520, step 550, step 530, step 560, step 540, step 570 and step 580 (that will be explained below).

It is to be noted that steps 520 and 550 are carried out when assembling machine 100, while steps 530 and 560 and 540 and 570 are carried out during operation of machine 100, i.e. they are part of a measuring process.

Preferably, the positioning at step 520 and the positioning at step 550 lead to the first single vibrating mass and the second single vibrating mass being exposed to a same temperature (or almost the same temperature) and to a same pressure (or almost the same pressure).

Advantageously, the method according to flow chart 500 further includes the step of:

E) step 580: repeatedly comparing the resonance frequencies, in particular the resonance frequency of the first electric resonance vibration and the resonance frequency of the second electric resonance vibration.

The repetition referred to in steps 530 and 560 and 540 and 570 and 580 corresponds to loop L2 in flow chart 500 of FIG. 5. The loop may be repeated with a period preferably longer than 1 hour and preferably shorter than 1 day as fouling and erosion progress quite slowly; it is to be noted that the period of repetition does not need to be strictly constant, for example a variation of up to 10% or 20% (or even more) is acceptable.

Loop L2 may be continuously repeated from start-up of machine 100 to shut-down of machine 100; therefore, advantageously, loop L2 is interrupted when machine 100 is not operating.

Preferably, the resonance frequency of the first electric resonance vibration and the resonance frequency of the second electric resonance vibration are greater than 20 KHz even if not always identical due to the possible difference between the mass of the first vibrating mass and the mass of the second vibrating mass.

According to a first possibility, the resonance frequency of the first electric resonance vibration and the resonance frequency of the second electric resonance vibration are identical (or almost identical) when the first plate (for example first plate 320 in FIG. 3) has no fouling or is not eroded. A frequency difference exists and may be measured after fouling or erosion.

According to a second preferable possibility, the resonance frequency of the first electric resonance vibration and the resonance frequency of the second electric resonance vibration are different when the first plate (for example first plate 320 in FIG. 3) has no fouling or is not eroded; this difference is preferably greater than 500 Hz. The frequency difference increases or decreases and may be measured after fouling or erosion.

Steps 530 and 560 and 540 and 570 may be carried out for example by a measurement or monitor electronic unit of machine 100 that is not shown in any figure and that may be electrically connected to electric cables 314 and 344 of sensor arrangement 300.

The above-mentioned measurement or monitor electronic unit may process the frequency measurements carried out as well as compare, for example subtract, the measured resonance frequencies (see step 580). For example, any time it makes a frequency subtraction between a resonance frequency of the first electric resonance vibration and a resonance frequency of the second electric resonance vibration, it may compare the subtracted value with an upper threshold value and/or a lower threshold value; if any of these threshold values is exceeded it may signal such event for example to an electronic control unit of the machine and/or to an operator; such signaling may be an electronic indication (for example and electronic message sent to an electronic control unit of the machine) and/or a visual indication and/or a sound indication.

It is to be noted that, advantageously, the use of two vibrating masses (preferably at the same temperature and pressure) allows an automatic compensation of the frequency measurements; therefore, some pre-processing before threshold comparison or comparisons may be unnecessary.

As already explained, sensor arrangements identical or similar to sensor arrangement 200 and sensor arrangement 300 may be advantageously installed and used in machines, preferably turbomachines, more preferably single-stage or multi-stage centrifugal compressors.

Any machine may include one or more such sensor arrangements.

Furthermore, such a machine may include a measurement or monitor electronic unit or be associated to a measurement or monitor electronic unit; the same unit may be connected (through wired and/or wireless connections) to one or more such sensor arrangements.

In these cases, preferably, a first plate of the sensor arrangement forms a portion of a wall of a flow path of the machine wherein a working fluid flows. If erosion is measured or monitored, it is advantageous that the first plate is made of a plate material, the wall is made of a wall material, and the plate material and the wall material are a same material; it is even further advantageous that the material of the first plate, the second plate and the wall is the same.

The invention claimed is:

1. A sensor arrangement, comprising:
   a first single vibrating mass comprising a first piezoelectric transducer and a first plate fixedly coupled to the first piezoelectric transducer;
   a second single vibrating mass comprising a second piezoelectric transducer and a second plate fixedly coupled to the second piezoelectric transducer; and
   a liquid detector,
   wherein the first single vibrating mass and the second single vibrating mass are disposed on opposite sides of a first cavity,
   wherein the second single vibrating mass is equal to the first single vibrating mass,
   wherein the first piezoelectric transducer and the second piezoelectric transducer are arranged to be stimulated by electric signals;
   wherein, when installed in a machine, the sensor arrangement is arranged so as to expose the first single vibrating mass and the second single vibrating mass to a temperature and a pressure that is the same, to expose the first plate to a first flow of a working fluid in the machine, and to expose the second plate to a second flow of the working fluid in the machine,
   wherein the first flow is different from the second flow,
   wherein the second single vibrating mass is disposed adjacent to a second cavity, and
   wherein the liquid detector is positioned in the second cavity.

2. The sensor arrangement of claim 1, further comprising:
   a hollow member disposed between the first single vibrating mass and the second single vibrating mass.

3. The sensor arrangement of claim 1, further comprising:
   wherein the second single vibrating mass is disposed adjacent to the second cavity, and
   wherein the second cavity is arranged to receive the working fluid in the machine.

4. The sensor arrangement of claim 1, further comprising:
   wherein the second single vibrating mass is disposed adjacent to the second cavity, and
   wherein the first cavity is arranged to be in fluid communication with a working fluid flow path of the machine.

5. The sensor arrangement of claim 1, further comprising:
   a draining channel,
   wherein the second single vibrating mass is disposed adjacent to the second cavity, and
   wherein the draining channel is fluidly coupled to the second cavity and is arranged to drain liquid from the second cavity.

6. The sensor arrangement of claim 1, further comprising:
   a tubular shell arranged to be fit in a recess of a wall of a flow path of the machine.

7. A machine to operate through a working fluid flowing in an internal flow path of the machine, the machine comprising:
   at least one sensor arrangement according to claim 1;
   wherein the first plate forms a portion of a wall of said flow path, and
   wherein the first plate and the wall are made of the same material.

8. The machine of claim 7, wherein the sensor arrangement further comprises:
   a hollow member disposed between the first single vibrating mass and the second single vibrating mass.

9. The machine of claim 7, wherein the second single vibrating mass is disposed adjacent to the second cavity, and wherein the second cavity is arranged to receive the working fluid in the machine.

10. The machine of claim 7, wherein the sensor arrangement further comprises:
    a draining channel,
    wherein the second single vibrating mass is disposed adjacent to the second cavity, and
    wherein the draining channel is fluidly coupled to the second cavity and is arranged to drain liquid from the second cavity.

11. The machine of claim 7, wherein the sensor arrangement further comprises:
    a tubular shell arranged to be fit in a recess of a wall of a flow path of the machine.

12. The machine of claim 7, wherein the first cavity is divided into two sub-cavities.

13. A machine to operate through a working fluid flowing in an internal flow path of the machine, the machine comprising:
    at least one sensor arrangement according to claim 1;
    wherein the first plate forms a portion of a wall of said flow path, and
    wherein said machine comprises one of a single-stage compressor or a multi-stage centrifugal compressor.

14. The machine of claim 13, wherein the first plate and the wall are made of different materials.

15. The machine of claim 13, wherein the sensor arrangement further comprises:
    a hollow member disposed between the first single vibrating mass and the second single vibrating mass.

16. The machine of claim 13, wherein the second single vibrating mass is disposed adjacent to the second cavity, and wherein the second cavity is arranged to receive the working fluid in the machine.

17. The machine of claim 13, wherein the sensor arrangement further comprises:
    a draining channel,
    wherein the second single vibrating mass is disposed adjacent to the second cavity, and wherein the draining channel is fluidly coupled to the second cavity and is arranged to drain liquid from the second cavity.

18. The machine of claim 13, wherein the sensor arrangement further comprises:
a tubular shell arranged to be fit in a recess of a wall of a flow path of the machine.

19. The machine of claim 13, wherein the first cavity is divided into two sub-cavities.

20. The sensor arrangement of claim 1, wherein the first cavity is divided into two sub-cavities.

\* \* \* \* \*